Nov. 25, 1924.　　　　　　　　　　　　　　　　　　　　1,516,974
W. R. LOVEMAN
ELECTRIC BATTERY
Filed July 31, 1920
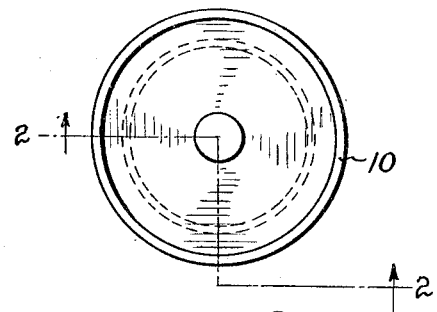
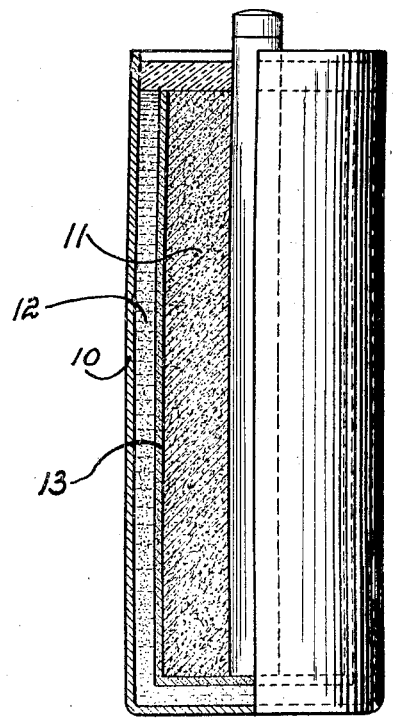
WITNESSES:
Chester F. Hayden
INVENTOR
William R. Loveman
BY
A. V. Wooster
ATTORNEY Patented Nov. 25, 1924.

1,516,974

UNITED STATES PATENT OFFICE.

WILLIAM R. LOVEMAN, OF BRIDGEPORT, CONNECTICUT, ASSIGNOR TO THE BRIDGEPORT METAL GOODS MANUFACTURING COMPANY, OF BRIDGEPORT, CONNECTICUT, A CORPORATION OF CONNECTICUT.

ELECTRIC BATTERY.

Application filed July 31, 1920. Serial No. 400,379.

*To all whom it may concern:*

Be it known that, I, WILLIAM R. LOVEMAN, a citizen of the United States, residing at Bridgeport, county of Fairfield, State of Connecticut, have invented an Improvement in Electric Batteries, of which the following is a specification.

An ordinary battery cell of the "bag" type comprises a zinc shell, constituting the negative electrode of the battery, a carbon rod around which is tamped a mixture of manganese dioxide and graphite moistened with an exciting fluid, commonly zinc and ammonium chlorides, constituting the positive electrode, an electrolyte of gelatinizable paste which fills the annular space which separates the electrodes, and a wrapping of gauze or cheese cloth which is securely tied around the positive electrode to prevent disintegration of the fine particles of the tamped mix and their migration to the negative electrode.

The present invention produces a battery the cell of which may be in all respects like a "bag" type battery cell, except that a substitute covering, consisting of a mucilaginous coating which is preferably quick setting, is provided to take the place of the usual gauze or cheese cloth wrapping which surrounds the positive electrode, the object of the invention being to provide a satisfactory covering which is composed of cheaper material than are gauze or cheese cloth, which can be more economically applied, and which will effectually perform all of the functions which are performed by the gauze or cheese cloth wrapping.

With the above and other objects in view, the invention will now be fully described and hereinafter specifically claimed.

In the accompanying drawing forming a part of this specification,

Fig. 1 is a top plan view of a battery in which are incorporated the features of the invention; and Fig. 2 is a sectional view on line 2—2 in Fig. 1, looking in the direction of the arrows.

The improved battery comprises a zinc shell or negative electrode, denoted by 10, a carbon rod around which is tamped a mixture of manganese dioxide and graphite moistened with an exciting fluid, or positive electrode, denoted by 11, an electrolyte of gelatinizable paste, denoted by 12, which fills the space between the positive and negative electrodes, and a mucilaginous coating, denoted by 13, which covers one of the electrodes.

The substitute covering of the invention is preferably placed upon the positive electrode, and may be applied in the following manner: The electrode, while the tamped mix thereof is fresh and moist, is placed in an atmosphere of fine particles of starch. The fine particles adhere to the moist surface of the electrode and are hydrolized by the exciting fluid of the tamped mix into a clear gelatinous product of conversion which covers the entire surface of the electrode and forms thereon a mucilaginous quick setting and porous coating, which, when the electrode is in use, effectually performs all of the functions of an ordinary gauze or cheese cloth wrapping and offers less resistance to the battery action. Starch may be assumed to have the chemical formula $(C_6H_{10}O_5)n$, and is a highly condensed hexose carbohydrate consisting of a great many anhydride groups, so that the mucilaginous coating of the invention, when applied in the manner just described, consists mainly of many equivalents of dextrose. There will be however, in the coating smaller amounts of various materials, such as zinc chloride, sal ammoniac and water.

It will be obvious that the mucilaginous coating may be applied to the inner surface of the zinc shell instead of to the positive electrode. This can be done by first moistening said inner surface with an electrolyte and then applying the starch particles as in the case of the positive electrode.

What I claim is:

1. The step in the method of making a dry cell electrode which consists in moistening the electrode with an exciting fluid and applying a coating of fine starch particles thereto by placing the moistened electrode in an atmosphere of said starch particles.

2. The step in the method of making a dry cell electrode which consists in moistening the electrode with an exciting fluid, and applying to said moistened electrode a coating of fine dry starch particles.

3. The method of making a dry cell electrode which consists in tamping about a carbon rod a mixture of manganese dioxide and graphite moistened with an exciting fluid, and applying to said moistened electrode fine dry starch particles.

4. The method of making a dry cell electrode which consists in tamping about a carbon rod a mixture of maganese dioxide and graphite moistened with an exciting fluid, and placing the moist electrode in an atmosphere of fine starch particles.

5. The method of making a dry cell electrode which consists in providing about a carbon rod a mix moistened with an exciting fluid and applying to the surface of said moistened mix a coating of fine dry starch particles.

6. The method of making a dry cell electrode which consists in providing about a carbon rod a mix moistened with an exciting fluid, and placing the moistened mix in an atmosphere of fine starch particles.

In testimony whereof I affix my signature.

WILLIAM R. LOVEMAN.